United States Patent
Brownstein (10) Patent No.: US 10,249,216 B1
(45) Date of Patent: Apr. 2, 2019

(54) SYSTEM AND USE METHOD FOR A MORSE CODE TRAINING TOOL

(71) Applicant: Robert Brownstein, Santa Cruz, CA (US)

(72) Inventor: Robert Brownstein, Santa Cruz, CA (US)

(73) Assignee: The CW Operators' Club, McLean, VA (US)

( * ) Notice: Subject to any disclaimer, the term of this patent is extended or adjusted under 35 U.S.C. 154(b) by 0 days.

(21) Appl. No.: 15/869,483

(22) Filed: Jan. 12, 2018

(51) Int. Cl.
*G09B 19/26* (2006.01)
*G09B 5/04* (2006.01)

(52) U.S. Cl.
CPC ............. *G09B 19/26* (2013.01); *G09B 5/04* (2013.01)

(58) Field of Classification Search
CPC ......... G09B 19/00; G09B 19/26; H04L 15/00; H04L 15/04; H03M 7/4025; H03M 7/40; H03M 5/00
See application file for complete search history.

(56) References Cited

U.S. PATENT DOCUMENTS

| | | | |
|---|---|---|---|
| 3,038,030 A | 6/1962 | Murray | |
| 3,267,456 A | 8/1966 | Morris et al. | |
| 3,505,667 A | 4/1970 | Wald | |
| 3,645,015 A * | 2/1972 | Pfeiffer | G09B 19/26 434/222 |
| 3,656,157 A * | 4/1972 | Romney | G09B 19/26 340/404.1 |
| 4,255,749 A | 3/1981 | Henry | |
| 6,378,234 B1 * | 4/2002 | Luo | G06F 3/0233 341/22 |
| 2009/0215494 A1 * | 8/2009 | Causey | H04M 1/26 455/564 |

OTHER PUBLICATIONS

Brownstein. Teaching Morse Code using a Virtual Classroom Environment. 2012 [online], [retrieved on Oct. 9, 2018]. Retrieved from the Internet <URL:http://cwops.org/cwa/Teaching%20Morse%20Code%20Using%20a%20Virtual%20Classroom%20Environment.pdf>.*

* cited by examiner

*Primary Examiner* — Peter R Egloff
(74) *Attorney, Agent, or Firm* — Robert Brownstein (57) ABSTRACT

A Morse code training tool and use method for learning how to copy and send Morse coded messages.

8 Claims, 7 Drawing Sheets

Figure 7

SYSTEM AND USE METHOD FOR A MORSE CODE TRAINING TOOL

TECHNICAL FIELD

This is a system for training users how to copy and send Morse code.

BACKGROUND OF THE INVENTION

The first form of electric communication, dating back to the early 1840s, used an encoding and decoding scheme involving two binary elements—a long duration element and a short duration element. The longer was called a "dash" and the shorter was called a "dot."

An alphabetic code was developed whereby the characters were associated with one or more elements in unique combinations. Similarly, the digits zero through nine were associated with unique element combinations. A message, for example, could then be converted into the equivalent of alphabetic characters whereby individual letters were separated from one another by leaving a short time interval or space, and words were distinguished from one another by leaving a longer time interval between the last character of a previous word and the first character of a following word.

Using a large switch, called a "key," an operator could encode a message by closing then opening the key for short or long durations and allowing appropriate time intervals between characters and words. This was called "sending." Another operator, upon hearing the encoded message's code elements could decode the message into the appropriate characters and words. This was called "copying."

By the early twentieth century, a similar scheme was adopted for sending and copying wireless signals that were keyed into appropriate short and long duration elements.

Currently, thousands of wireless operators use Morse coded encoding and decoding on the high-frequency bands allocated to amateur radio operators, worldwide. As a result, there is a demand for tools and methods for learning to send and copy Morse code.

In the early- to mid-twentieth century, phonograph records and special tape recorders were used for teaching Morse copying. Sending was taught using interactive methods involving learners and instructors whereby learners would send and advisors would assess the accuracy.

Currently, the Internet serves as a medium for several tools that continue the training of Morse code copying. However, sending is still essentially learned by interaction with learners and instructors.

BRIEF DESCRIPTION OF INVENTION

The invention herein disclosed and claimed provides both training in copying as well as in sending proper Morse code. As such, it does not require an interactive teaching environment of learners and instructors. A learner is able to send and obtain immediate feedback on the accuracy of his/her sending.

Training is broken down into character, word and phrase segments, and these are then stored, each segment having a unique index. During copy practice, a user selects a segment, listens to the Morse being sent, and learns to copy the segment's contents. During sending, a user selects a segment, listens to the Morse being sent, then attempts to emulate what was sent by sending the same content back to the system. The system then determines if what was sent was sent accurately. If so, an affirmation display or sound is sent. If not, either no display or sound is sent, or a different display or sound is sent which signifies inaccuracy. A visual display may also be used to show the characters and spacing. By a user striving to achieve a succession of affirmative results, the user learns how to properly send each segment's contents.

To simplify the interface between the system and a user's Morse code sending apparatus, the two are coupled acoustically. That is, the sound of the sent Morse code is picked up by the system's microphone. Hence there is no electrical interface required.

The encoding and decoding is all done by the system using a simple microcontroller and program. During sending practice, comparisons between what was sent by the system and then subsequently sent by the user can be done by comparing the time-varying signal of what the system sends to the time-varying user's sending as received by the system. Appropriate tolerances can be built in so that accuracy need not be perfect but more than adequate for successful decoding.

DETAILED DESCRIPTION OF THE INVENTION

Learning to copy and send Morse code is best learned by sending Morse coded content at a letter speed sufficiently fast so as to discourage counting dashes and dots, but slow enough to enable a learner to hear the unique sound patterns of each character.

As in learning to read, a Morse code learner first learns to identify the letters, then words, then phrases of words, and so on. One can learn to copy by writing down characters and words, or by keeping the gist of what is being copied in one's head rather than writing it down. The latter is known as "head copy."

The order in which characters are learned can be varied. Learning some vowels early on, though, helps to allow for more richness in word choices based on the learned characters at any time. For example, learning the letters T, E, A and N, first, allows one to also learn to recognize such words as TEN, NET, NEAT, AT, TEA, TEE, TEEN and so on.

Once a pedagogy has been adopted as to the pace and content of learning the characters, one can divide the content into segments.

Figure 1:
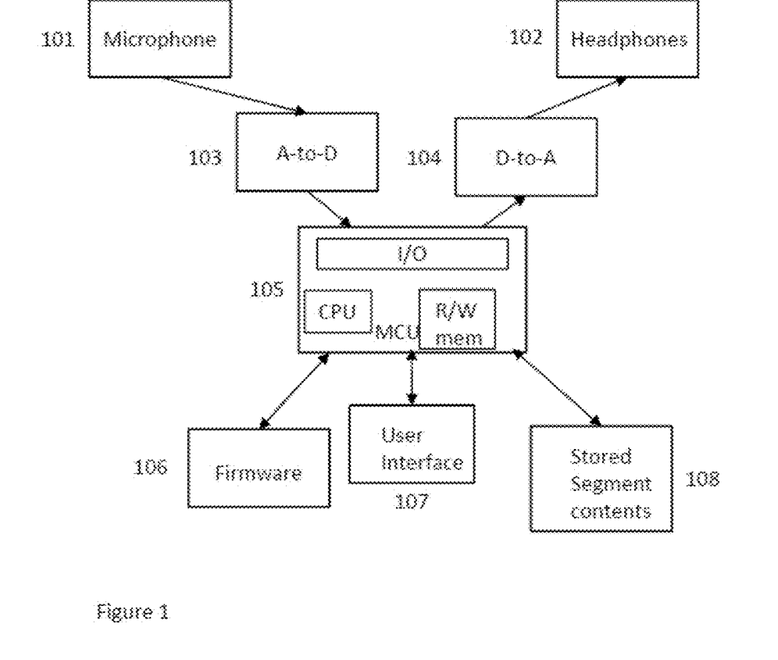
FIG. 1 depicts one embodiment of the system and its subsystems.

FIG. 1 shows one embodiment of the system herein disclosed. For sending practice, a microphone (101) enables receiving the audio of what a user is sending. An analog-to-digital converter (103) will in near real time convert that audio into digital content. The processing subsystem (105)

comprises a microcontroller further comprising a CPU, read/write memory and input/output functional blocks. A firmware subsystem (106) is where the training program is stored for execution. A user interface (UI) subsystem (107) provides user control selectors and display functions. And a memory (108) subsystem is used to store all the segments content.

During copying practice, a user would select a practice segment using the user interface which would then address storage contents, which are then sent to the read/write memory. The microcontroller, under program control, would process the segment content and pass it on to a digital-to-analog (104) converter. The resulting analog audio would then be reproduced by the headphones (102).

During sending practice, the system would do the same sequence of steps for copying practice but after sending the content, it would await reception of user-sent audio. The microphone (101) would capture that audio, the analog-to-digital converter (103) would convert the audio to digital, the read/write memory would store what was received and the microcontroller would compare the digitized receive audio's time-varying characteristics to those of the segment contents that were sent for emulation. The program would prompt the microcontroller to compare both digital files of time-varying signals and determine accuracy based on some tolerance limitations. If the accuracy was acceptable, the microcontroller could send a signal to the user interface to display an affirmation icon or LED, or it could send a digitized audio tone to the A-to-D to be reproduced by the headphones.

Programs for receiving Morse coded signals and converting them into characters exist. These are called "code readers." They are designed to enable someone who does not have copying skills to decode Morse coded signals by reading the decoded text. Typically, such programs have wide tolerance for inter-character and inter-word spacing to allow for sloppily sent Morse to be decoded. The method used in this invention, however, does not rely on code reading algorithms. During sending practice a predetermined code sequence is sent based on the segment contents selected. The time-varying characteristics of that code sequence are likewise predetermined. When the user attempts to emulate what was sent by sending with his/her sending apparatus, the time-varying characteristics should closely resemble those of the segment contents sent. Since the timing proportions in Morse code are relative—a dash is three times longer than a dot, for example, and the inter-character space is one dot duration—regardless of the speed used, the time-varying characteristics can be easily normalized and compared. Thus, a segment contents sequence sent at, say, 25 wpm and emulated by a user at, say 15 wpm, would have the same proportional time-varying characteristics. Thus, the system is able to determine the accuracy simply by comparing those time-varying characteristics. There is no need for the program to decode what was sent into text characters. Since the textual sequence is predetermined, the time-varying characteristics of the user-sent code can be used to determine the textual juxtapositions again without need of decoding. In other words, if the segment sent text was TEN but the user had too long an interval between the E and N, the system could easily and quickly determine the textual positioning and display TE N showing the spacing error. It would not need to actually decode what was sent. Of course, in terms of accuracy, the system would simply affirm an accurately sent sequence.

To avoid capturing extraneous noise during sending practice, the microphone input can be filtered so that tones with a frequency between, say, 300 and 800 Hertz are passed through while those above and below are attenuated. In addition, the input can be squelched so that only sounds above a certain volume level will be captured whereas those below that level are ignored. Furthermore, the bandpass filter can also be used to pass the 300 to 800 Hertz Morse tones derived from the segment contents during copy practice. This would significantly reduce other extraneous tones, above or below the passband spectrum, from interfering with segment content tones during copy or sending practice.

Figure 2:
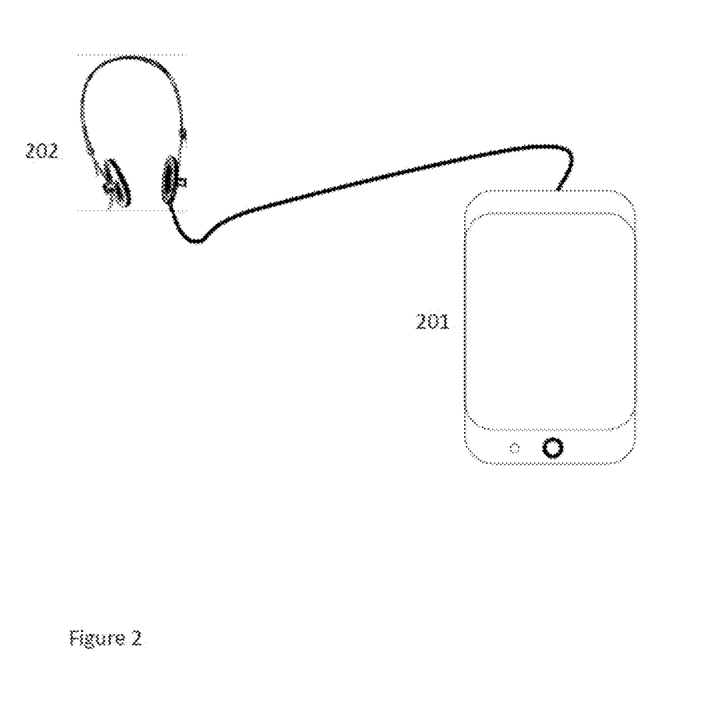
FIG. 2 depicts one embodiment of the system and a connected headset.

FIG. 2 shows an embodiment of the system whereby a user operates it via UI controls on the system (201) while listening to audio of the segment content on the headphone (202). The text of whatever is sent may also be shown on the UI subsystem's display.

Figure 3:
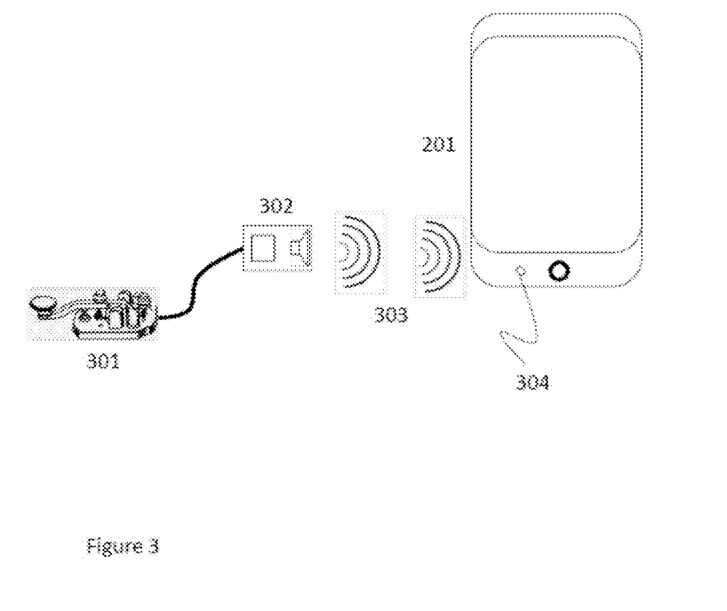
FIG. 3 depicts one embodiment of the system receiving the audio signals as sent by a user using a mechanical key.

FIG. 3 shows an embodiment whereby the user's Morse sending apparatus comprises a manual key (301) and oscillator (302). The oscillator comprises a speaker so that the Morse sound (303) is reproduced at high enough volume level to be captured by system's (201) microphone (304).

Figure 4:
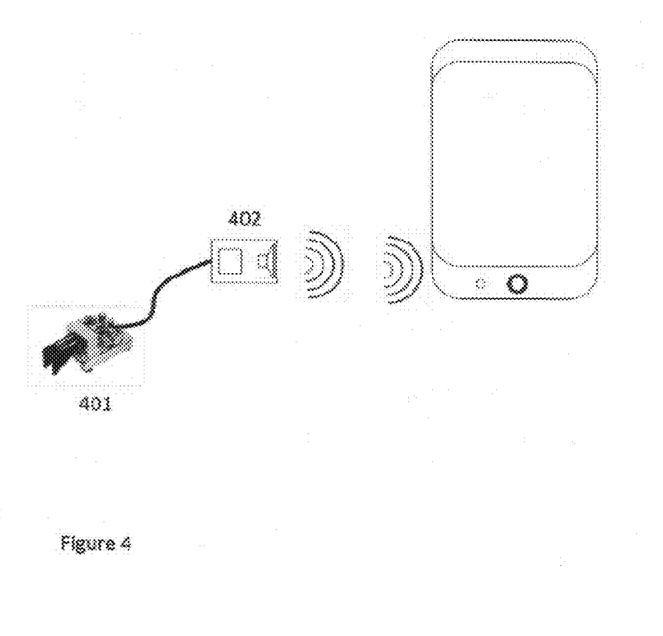
FIG. 4 depicts one embodiment of the system receiving the audio signals as sent by a fully automatic key.

FIG. 4 shows an embodiment whereby the user's Morse sending apparatus comprises a keyer paddle (401) and keyer (402) whereby short and long duration elements are sent successively while the appropriate paddle tab is held closed. Here, again, the sound output is of sufficient audible volume to be captured by the system's microphone.

Figure 5:
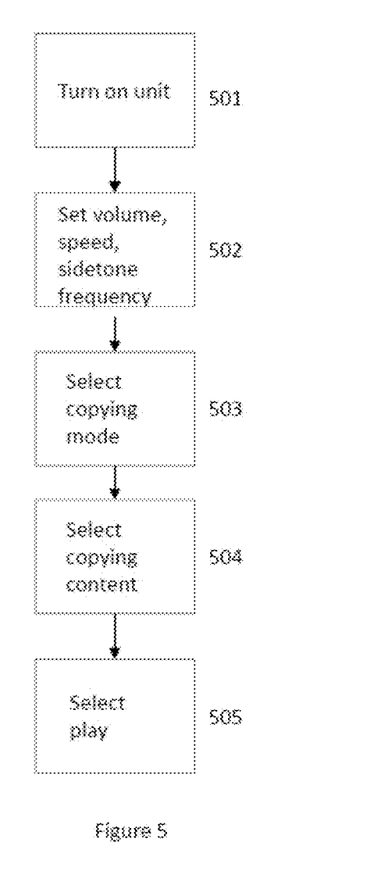
FIG. 5 is a flow diagram showing one embodiment of a use method for copying practice

In one embodiment of a use method, FIG. 5, the unit is powered on (501) and the UI controls are used to set volume, speed and sidetone frequency (e.g. the tone of the Morse that is sent). Next, the user uses the UI controls to select the practice mode for "copying" (503). Next, the user selects the segment to be practiced (504), and finally the user selects "play" (505). This would cause the system to send the segment content to the D-to-A converter and the resulting analog signal to the speaker.

Figure 6:
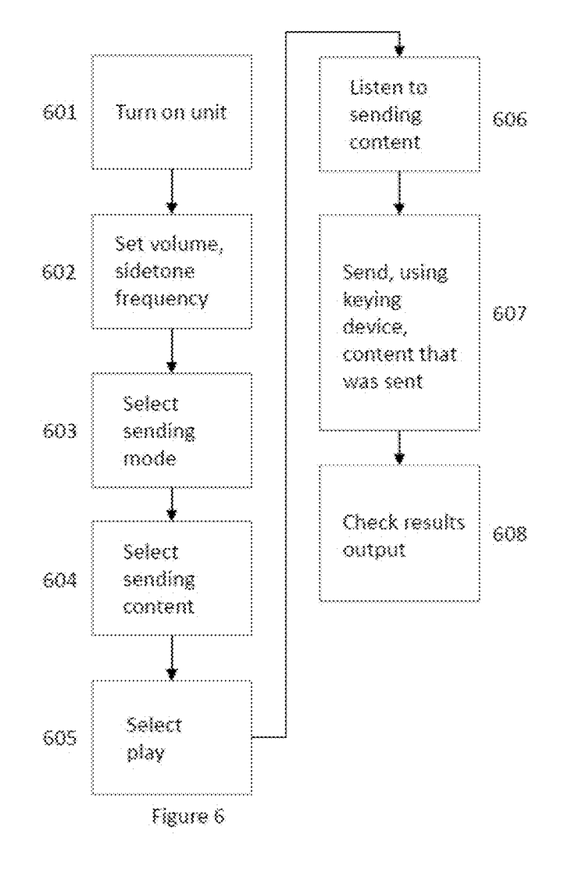
FIG. 6 is a flow diagram showing one embodiment of a use method for sending practice.

In FIG. 6, an embodiment of another use method, the unit is powered on (601), parameters are set (602), and the practice mode for "sending" is selected (603). Next, the user selects the content segment to be sent (604). Then, the user selects "play" (605). Again, the system sends the content via the D-to-A to the speaker and the user listens to the sent content (606). Following the sending by the system of the segment content, the user attempts to emulate that segment's contents by using a Morse code sending apparatus (607). After the user sends the emulated content, the user can check the results output (608) to see if the system affirms the content was accurately sent.

Figure 7:
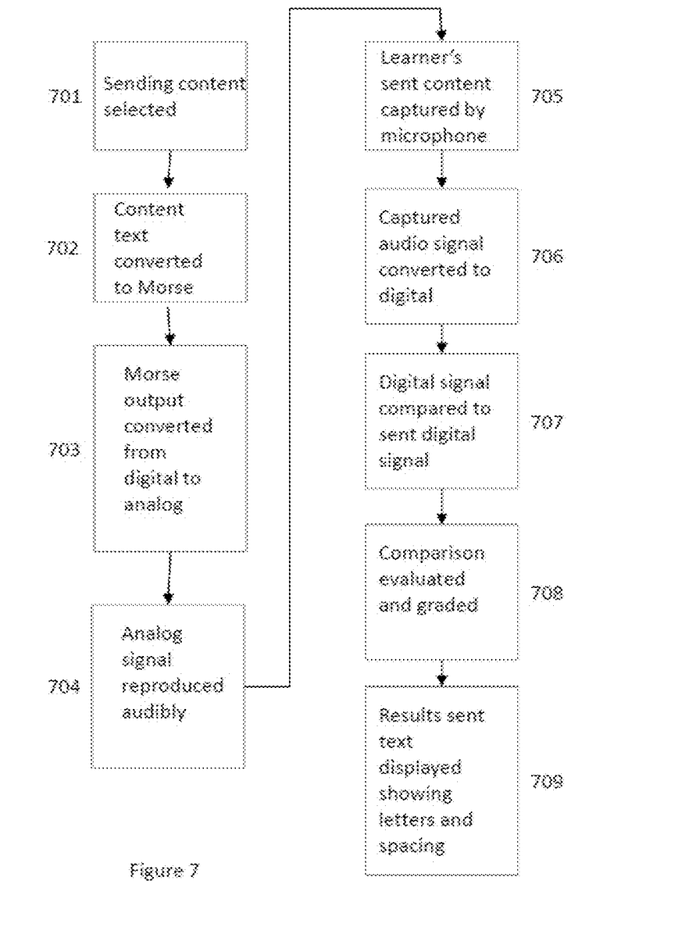
FIG. 7 is a flow diagram showing in more detail how the system's subsystems process what is to be sent by the system and what is received by the system.

In FIG. 7, the user selects the content to be sent (701). That content is converted to Morse (702). That Morse content is converted from digital to analog (703), and the analog signal is reproduced audibly (704). The system's microphone captures the sent content's analog audible signal (705). This is then converted to its digital equivalent (706) preserving its time-varying characteristics. That digital file is compared to time-varying characteristics of the digital file of the original content sent by the system (707). The system compares and determines whether the sent content was sent accurately (708). The UI then displays the content sent by the user showing the decoded letters and spaces (709).

The sending practice functionality of the invention is its primary novelty. It enables training of both Morse copying and sending. It may be packaged in a variety of ways including as an application that runs on a mobile device, such as a smartphone. Alternatively, it may be packaged as a purpose-built device used solely for Morse code training. Although the subsystems in FIG. 1 are shown as separate entities, these may be integrated so as to reduce the number of components and perhaps the cost. The UI may consist of simply a digital display, such as an LCD display where control is done with one or more small switches. It may also be done using a touch-screen display whereby control and display are done using displayed icons and pixels and no physical control switches other than, say, a power on switch is provided.

Clearly, an electronic device requires power to operate. No power source is shown but small replaceable batteries could be included and/or rechargeable batteries and external charging accessories may be used.

The drawings and embodiment descriptions are intended to be exemplary and should not be read as limiting the scope or implementation of the invention. Similarly, the type of microcontroller is not crucial nor is the training program code so long as it implements and controls the copying and sending training functions as disclosed.

What is claimed is:

1. A system for training Morse code copying and sending comprising:
   a microphone operative to convert received Morse code audio tones, as generated by a user, into analog electrical signals;
   an analog-to-digital converter operative to convert said analog electrical signals into equivalent-value digital signals preserving time-varying characteristics;
   a microcontroller comprising a central processing unit, read/write memory and input/output functional blocks;
   firmware memory comprising a stored training program;
   said training program operative to instruct said microcontroller to encode text sequences into time-varying Morse coded sequences;
   said training program operative to instruct said microcontroller to generate Morse code audio tones based on said time-varying Morse coded sequences;
   said training program operative to instruct said microcontroller to capture said Morse code audio tones generated by said user;
   said training program operative to instruct said microcontroller to convert said Morse code audio tones, generated by said user, into said time-varying Morse coded sequences;
   said training program operative to instruct said microcontroller to compare said time-varying Morse coded sequences converted into said Morse code audio tones previously sent by said system to those said Morse code audio tones subsequently sent by a user;
   said training program operative to instruct said microcontroller to determine if said Morse code audio tones sent by said system and those said Morse code audio tones sent by said user are essentially identical;
   a user-interface subsystem comprising operational controls and visual display operative to power up said system, to select said time-varying Morse coded sequences, and to initiate comparisons of said Morse code audio tones sent by said user to Morse code audio tones sent by said system;
   a storage subsystem operative to store training-segment contents;
   a digital-to-analog converter operative to convert digitized Morse code sequences into equivalent Morse code analog signals; and
   headphones operative to convert said time-varying Morse coded sequences into audible sounds.

2. A claim as in claim 1 further comprising:
   an audio passband filter operative to pass audio electrical signals whose frequencies fall within a predetermined subset of values while attenuating said audio electrical signals with frequencies above and below said predetermined subset of values;
   said audio passband filter operates on said analog electrical signals conveyed by said microphone.

3. A claim as in claim 2 further comprising:
   said audio passband filter operates on said Morse code audio tone signals conveyed by said digital-to-analog converter to said headphones.

4. A claim as in claim 1 further comprising:
   said visual display operative to convert and display said digitized text equivalents into visual text characters.

5. A method for training Morse code copying and sending, comprising:
   powering on a Morse code training system, said Morse code training system comprising a read/write memory, a digital-to-analog converter, headphones, a sending apparatus, and an analog-to-digital converter;
   selecting a training mode comprising copying or sending of Morse code audio tones;
   if selecting copying, then:
      selecting a segment thereby loading said segment's contents to said read/write memory;
      selecting play to initiate a sequence comprising:
         processing said segment's contents in said read/write memory;
         conveying said segment's contents to said digital-to-analog converter for conversion to analog signals; and
         conveying said analog signals to said headphones;
   if selecting sending, then:
      selecting a segment thereby loading said segment's contents to said read/write memory;
      selecting play to initiate a sequence comprising:
         processing said segment's contents in said read/write memory;
         conveying said segment's contents to said digital-to-analog converter for conversion to analog signals; and
         conveying said analog signals to said headphones;
         emulating by said user said segment's contents by sending Morse code audio tones using said sending apparatus;
         capturing said tones using a microphone;
         converting said tones into digitized equivalents using said analog-to-digital converter;
         storing said digitized equivalents in said read/write memory;
         comparing said digitized equivalents to said segment's contents digital file; and
         affirming accuracy if said digitized equivalents matches said segment's contents digital file.

6. A claim as in claim 5 further comprising:
affirming said accuracy by illuminating a visual indicator.

7. A claim as in claim 5 further comprising:
affirming said accuracy by displaying an icon on a user interface display.

8. A claim as in claim 5 further comprising:
affirming said accuracy by emitting an audible tone via said headphones.

* * * * *